(12) United States Patent
Biesenbach et al.

(10) Patent No.: US 9,020,911 B2
(45) Date of Patent: Apr. 28, 2015

(54) NAME SEARCH USING MULTIPLE BITMAP DISTRIBUTIONS

(75) Inventors: David E. Biesenbach, Alexandria, VA (US); Steven J. Liddle, Vienna, VA (US); Stephen J. Watjen, Ashburn, VA (US); Charles K. Williams, Oak Hill, VA (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 13/353,252

(22) Filed: Jan. 18, 2012

(65) Prior Publication Data

US 2013/0185326 A1 Jul. 18, 2013

(51) Int. Cl.
*G06F 7/00* (2006.01)
*G06F 17/30* (2006.01)

(52) U.S. Cl.
CPC .................. *G06F 17/30675* (2013.01)

(58) Field of Classification Search
CPC ................................................. G06F 17/30324
USPC ......... 707/758, 769, 770, 780, 693, 708, 745, 707/801, 999.001, 999.002, 999.003
See application file for complete search history.

(56) References Cited

U.S. PATENT DOCUMENTS

| | | | |
|---|---|---|---|
| 5,850,448 A | | 12/1998 | Ganesan |
| 6,141,656 A | * | 10/2000 | Ozbutun et al. ........................ 1/1 |
| 6,173,298 B1 | | 1/2001 | Smadja |
| 6,314,399 B1 | | 11/2001 | Deligne et al. |
| 6,882,746 B1 | * | 4/2005 | Naveen et al. ................. 382/173 |
| 7,305,385 B1 | | 12/2007 | Dzikiewicz et al. |
| 7,599,921 B2 | | 10/2009 | Biesenbach et al. |
| 7,644,076 B1 | | 1/2010 | Ramesh et al. |
| 7,966,307 B2 | | 6/2011 | Iwayama et al. |
| 8,005,782 B2 | | 8/2011 | Reznik et al. |
| 8,051,069 B2 | * | 11/2011 | Johnson et al. ................ 707/718 |
| 2005/0216518 A1 | * | 9/2005 | Hu et al. ........................ 707/200 |
| 2009/0238474 A1 | | 9/2009 | Sandberg |

(Continued)

OTHER PUBLICATIONS

Simons, M., H. Ney, and S.C. Martin, "Distant Bigram Language Modelling Using Maximum Entropy", Proceedings of the IEEE International Conference on Acoustics, Speech and Signal Processing, vol. 2, Apr. 21-24, 1997, 4 pp.

(Continued)

*Primary Examiner* — MD. I Uddin
(74) *Attorney, Agent, or Firm* — Janaki K. Davda; Konrad, Raynes, Davda and Victor LLP

(57) ABSTRACT

Provided are a computer implemented method, computer program product, and system for matching names. For a first bitmap distribution, it is determined whether a first bitmap signature of a query name and a second bitmap signature of a target name have a number of character n-grams overlapping that meet or exceed a threshold to generate a first preliminary value. For a second bitmap distribution that is different from the first bitmap distribution, it is determined whether a third bitmap signature of the query name and a fourth bitmap signature of the target name have a number of character n-grams overlapping that meet or exceed a threshold to generate a second preliminary value. The first preliminary value and the second preliminary value are combined, and, if the combination results in a value of true, it is determined that the query name and the target name are to be further processed.

18 Claims, 16 Drawing Sheets

(56) References Cited

U.S. PATENT DOCUMENTS

2010/0125447 A1    5/2010   Goswami
2011/0197128 A1    8/2011   Assadollahi

OTHER PUBLICATIONS

Weinman, J.J., "Typographical Features for Scene Text Recognition", Proceedings of the IEEE 20th International Conference on Pattern Recognition, Aug. 23-26, 2010, 4 pp.

U.S. Appl. No. 13/445,839, filed Apr. 12, 2012, entitled "Name Search Using Multiple Bitmap Distributions", invented by D.E. Biesenbach et al., 37 pp.

Preliminary Remarks, dated Apr. 18, 2012, for U.S. Appl. No. 13/445,839, filed Apr. 12, 2012, entitled, "Name Search Using Multiple Bitmap Distributions", invented by D. Biesenbach et al., Total 1 page.

Office Action, dated Feb. 6, 2014, for U.S. Appl. No. 13/445,839, filed Apr. 12, 2012, entitled, "Name Search Using Multiple Bitmap Distributions", invented by D. Biesenbach et al., Total 1 page. Total 13 pages.

Response to Office Action, dated May 6, 2014, for U.S. Appl. No. 13/445,839, filed Apr. 12, 2012, entitled, "Name Search Using Multiple Bitmap Distributions", invented by D. Biesenbach et al., Total 8 pages.

Final Office Action, dated Aug. 13, 2014, for U.S. Appl. No. 13/445,839, filed Apr. 12, 2012, invented by D. Biesenbach et al., Total 11 pages.

Response to Final Office Action, dated Nov. 21, 2014, for U.S. Appl. No. 13/445,839, filed Apr. 12, 2012, invented by D. Biesenbach et al., Total 8 pages.

Notice of Allowance, dated Dec. 17, 2014, for U.S. Appl. No. 13/445,839, filed Apr. 12, 2012, invented by D. Biesenbach et al., Total 12 pages.

\* cited by examiner

300

| | J, N_ | NS, ON, JO | OH | HN | SO | SE | EN |
|---|---|---|---|---|---|---|---|
| JOHNSON | * | * | * | * | * | | |
| JONSEN | * | * | | | | * | * |

| | J, SE | N, EN | JO | ON | NS, OH | HN | SO |
|---|---|---|---|---|---|---|---|
| JOHNSON | * | * | * | * | * | * | * |
| JONSEN | * | * | | * | * | | |

FIG. 4

|       | _J, _Y | JA, YO | AC, OG | CK | K_, GI_ | I_ |
|-------|--------|--------|--------|----|---------|-----|
| JACK  | *      | *      | *      | *  | *       |     |
| YOGI  | *      | *      | *      |    | *       | *   |

FIG. 5

|      | _J | Y,<br>JA | AC | CK,<br>I_ | K_ | YO | OG | GI |
|------|----|----|----|----|----|----|----|----|
| JACK | *  | *  | *  | *  | *  |    |    |    |
| YOGI |    | *  |    | *  |    | *  | *  | *  |

| Bitmap Position | Bitmap Distribution 1 | Bitmap Distribution 2 |
|---|---|---|
| 1 | A | A |
| 2 | B, I, L | B, E |
| 3 | C, H, M | I, M, D |
| 4 | D, G, K | L, H, G, J |
| 5 | E, F, J | C, K, F |

FIG. 13

NAME SEARCH USING MULTIPLE BITMAP DISTRIBUTIONS

FIELD

Embodiments of the invention relate to name search using multiple bitmap distributions.

BACKGROUND

In an analytical name search engine, to determine whether a query name matches another name, the query name is compared to each other name from one or more data lists being searched to calculate a similarity score between each pair of names. Data list names whose similarity score is greater than a user-defined threshold are then returned to the user. Given the size of the data lists being searched, this process of comparing every name may be very slow.

A bitmap may be designed so that each bit in the bitmap represents a character n-gram. A character n-gram may be described as a group of n adjacent characters (e.g., in YOGI, GI may be a character n-gram where n=2). One way to improve speed is to use a bitmap filter in which character n-grams of n-letters turn on individual bits in the bitmap to form a bitmap signature. Names whose bitmap signatures do not overlap to the degree of the user-defined threshold are not subjected to more in-depth comparison, thereby, speeding up search.

However, the large number of potential character n-grams (e.g., using only alphabetic characters and a space results in 729 bigram combinations for n=2 and 18,954 trigram combinations for n=3) causes a one-to-one mapping of character n-grams-to-bits to be beyond the scope of current processing capabilities, which typically involve a bitmap of 64 bits. This limitation on the size of the bitmap filter forces overloading of the bits such that multiple character n-grams are assigned to the same bit.

For example, using n=2, if bigrams were assigned to 64 bits in a round-robin fashion, a bitmap may have a single bit representing the following bigrams: AA, CK, EU, HD, JN, LX, OG, QQ, VJ, XT. Any two names that share any of these bigrams would have the same bit turned on in their bitmap signatures. The unrelated names JACK and YOGI would, therefore, appear to be at least partially related, since the CK in JACK and the OG in YOGI would turn on the same bit. Sending unrelated name records through for more in-depth comparison when a similarity arises from this kind of overloading can reduce system performance. In addition, this situation may result in reduced search precision, since sending more unrelated matches through for further comparison will likely result in incorrect search returns.

In addition to allowing more unrelated names to be sent through for further analysis, the random distribution of bigrams into bitmap positions may prohibit legitimately related names from undergoing further comparison due to bitmap overloading. A bitmap distribution may be described as a table in which each column represents one or more character n-grams, and each row represents a name to be compared. The bitmap distribution is used to create bitmap signatures. Each row in the table for a name has a bitmap signature made up of bits that are set or not set according to the n-grams of that name and the shown distribution. Suppose, for example, that the bigrams NS, ON, and JO were all assigned to the same bitmap position. Also, the bigrams _J and N_ were assigned to the same bitmap position. Then, the two names JOHNSON and JONSEN have two common bits set in their bitmap signatures. These two possibly related names JOHNSON and JONSEN would not be subject to further comparison, since there are not enough bitmap positions in common.

In this example, only two bitmap positions are in common across the combined number of ten distinct bigrams contained in the two names. The fact that there are two clashes of bigrams, one of two bigrams and one of three bigrams, (i.e., multiple bigrams that are assigned to the same bitmap position) prevents there being enough bitmap positions in common to send the names through for the full similarity calculation. This situation will result in lower recall scores, since some legitimate matches will be excluded from further comparison.

SUMMARY

Provided are a computer implemented method, computer program product, and system for matching names. For a first bitmap distribution, a first bitmap signature for a query name and a second bitmap signature for a target name are created, and it is determined whether the first bitmap signature of the query name and the second bitmap signature of the target name have a number of character n-grams overlapping that meet or exceed a configurable threshold to generate a first preliminary value. For a second bitmap distribution that is different from the first bitmap distribution, a third bitmap signature for the query name and a fourth bitmap signature for the target name are created, and it is determined whether the third bitmap signature of the query name and the fourth bitmap signature of the target name have a number of character n-grams overlapping that meet or exceed a configurable threshold to generate a second preliminary value. The first preliminary value and the second preliminary value are combined using a logical operation. In response to determining that the logical operation results in a value of true, it is determined that the query name and the target name are to be processed for further comparisons.

BRIEF DESCRIPTION OF THE SEVERAL VIEWS OF THE DRAWINGS

In the drawings, like reference numbers represent corresponding parts throughout.

FIG. 2 is formed by FIG. 2A, FIG. 2B, and FIG. 2C.

FIG. 3 illustrates a subset of a first bitmap distribution for names JOHNSON and JONSEN in accordance with certain embodiments.

FIG. 4 illustrates a subset of a second bitmap distribution for names JOHNSON and JONSEN in accordance with certain embodiments.

FIG. 5 illustrates a subset of a third bitmap distribution for names JACK and YOGI in accordance with certain embodiments.

FIG. 6 illustrates a subset of a fourth bitmap distribution for names JACK and YOGI in accordance with certain embodiments.

FIG. 13 illustrates a table showing the first bitmap distribution and the second bitmap distribution in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
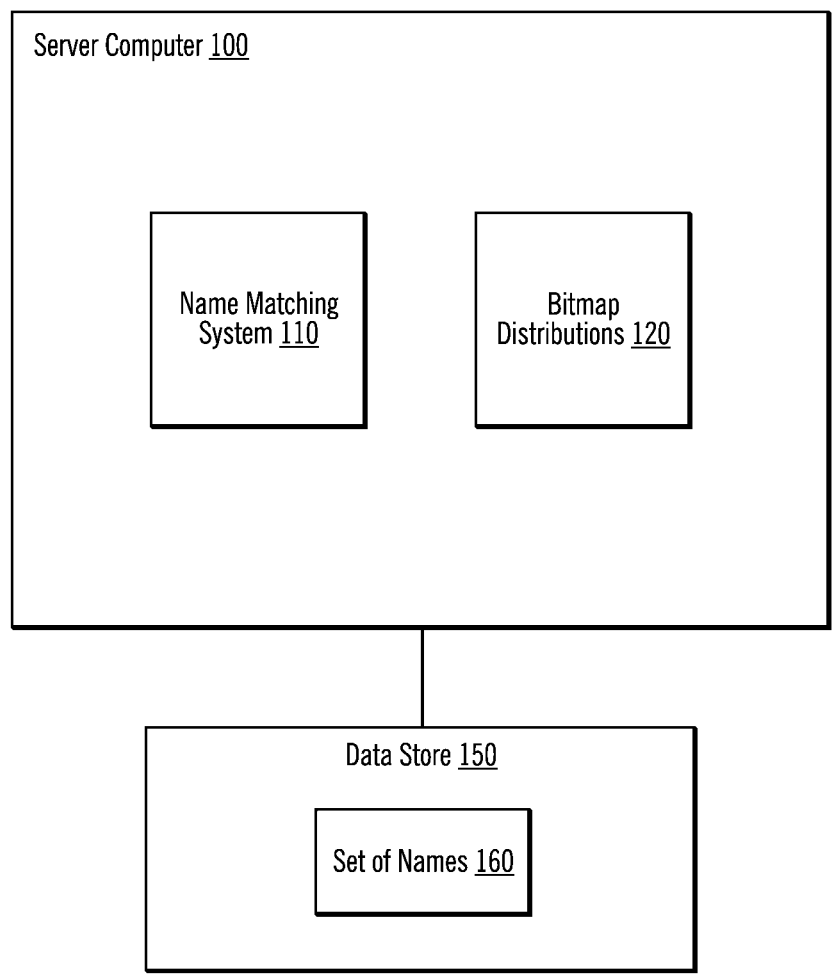
FIG. 1 illustrates a computing environment in accordance with certain embodiments.

FIG. 1 illustrates a computing environment in accordance with certain embodiments. A server computer 100 includes a name matching system 110 and two or more bitmap distributions 120. The server computer 100 is coupled to a data store 150, which stores a set of names 160. The set of names 160 may be a sample of names or may be names in a name data list that is to be searched to determine similarity to a provided name. Each of the bitmap distributions 120 may be overloaded in that a bit in a bitmap distribution may represent multiple character n-grams.

Figure 2A:
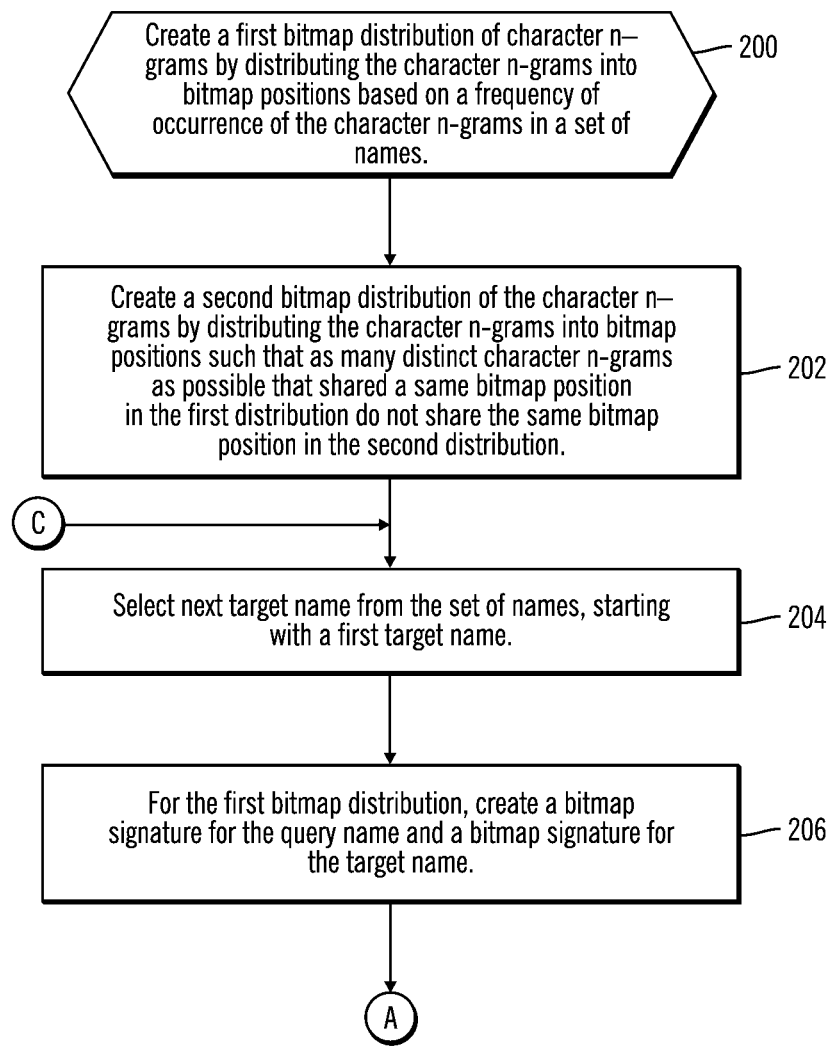
FIG. 2 illustrates, in a flow diagram, operations performed by a name matching system in accordance with certain embodiments.
Figure 2B:
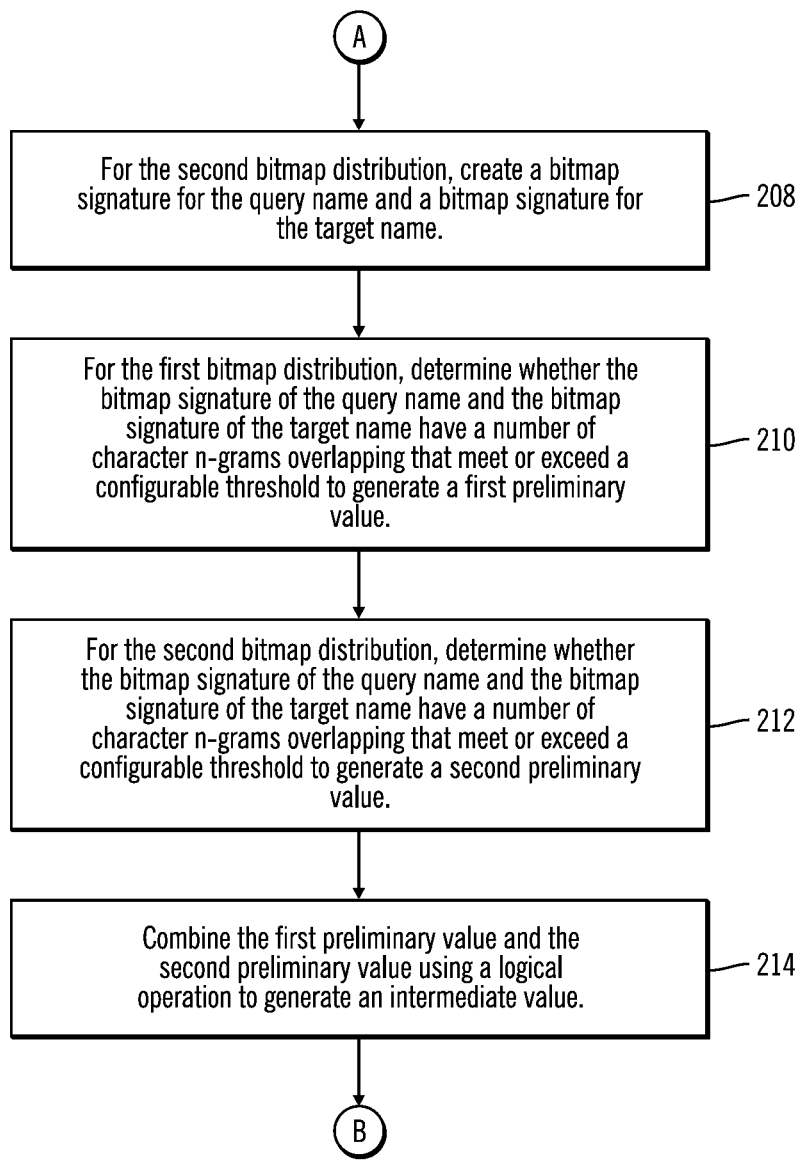
Figure 2C:
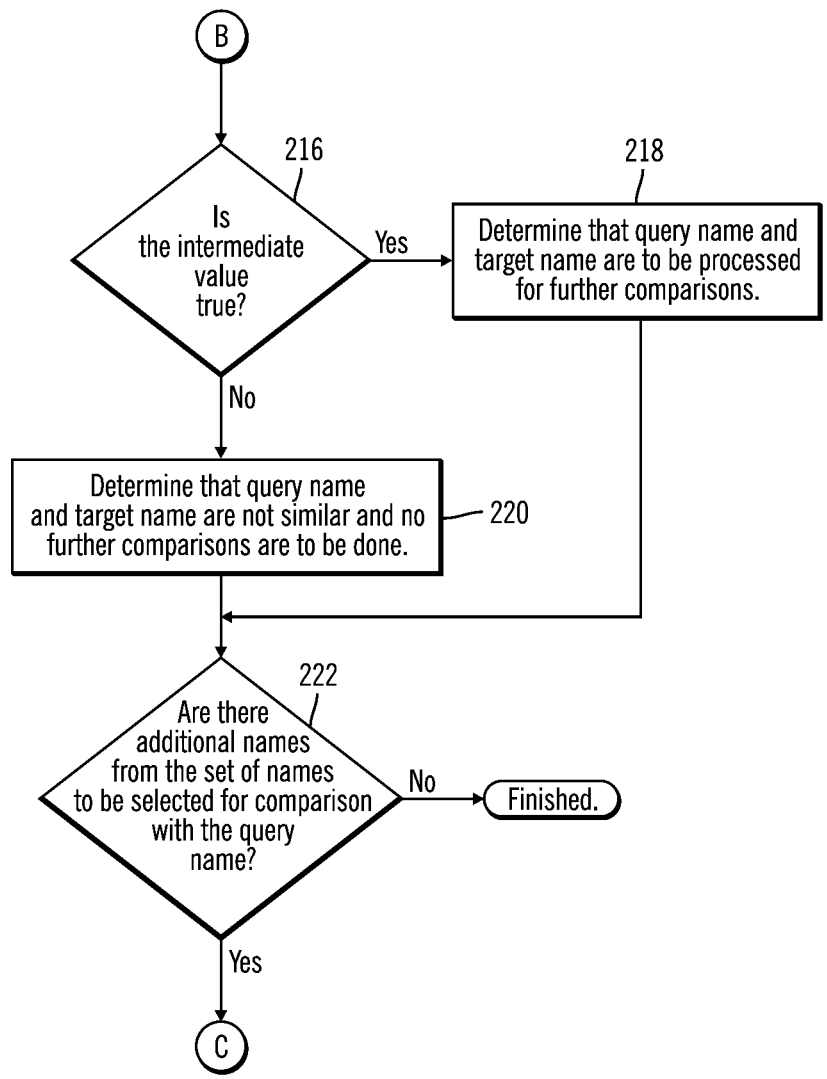

FIG. 2 illustrates, in a flow diagram, operations performed by the name matching system 110 in accordance with certain embodiments. FIG. 2 is formed by FIG. 2A, FIG. 2B, and FIG. 2C.

Control begins at block 200 with the name matching system 110 creating a first bitmap distribution of character n-grams by distributing the character n-grams into bitmap positions based on a frequency of occurrence of the character n-grams in a set of names.

In block 202, the name matching system 110 creates a second bitmap distribution of the character n-grams by distributing the character n-grams into bitmap positions such that as many distinct character n-grams as possible that shared a same bitmap position in the first distribution do not share the same bitmap position in the second distribution. In certain embodiments, two or more distributions may be created in block 202. When there are more than two distributions, then, again as many distinct character n-grams as possible that shared a same bitmap position in previous distributions should not share the same bitmap position in a subsequent distribution. Thus, the bitmap distributions may be optimized.

In block 204, the name matching system 110 selects a next target name from the set of names, starting with a first target name.

In block 206, for the first bitmap distribution (created in block 200), the name matching system 110 creates a bitmap signature for the query name and a bitmap signature for the target name. From block 206 (FIG. 2A), processing continues to block 208 (FIG. 2B). In block 208, for the second bitmap distribution (created in block 202), the name matching system 110 creates a bitmap signature for the query name and a bitmap signature for the target name. The processing of blocks 206 and 208 results in: (1) a bitmap signature for the query name for the first bitmap distribution; (2) a bitmap signature for the target name for the first bitmap distribution; (3) a bitmap signature for the query name for the second bitmap distribution; and (4) a bitmap signature for the target name for the second bitmap distribution.

In block 210, for the first bitmap distribution, the name matching system 110 determines whether the bitmap signature of the query name and the bitmap signature of the target name have a number of character n-grams overlapping that meet or exceed a configurable threshold to generate a first preliminary value. In certain embodiments, the preliminary value is a Boolean value of true or false. The configurable threshold may be user-defined. In block 212, for the second bitmap distribution, the name matching system 110 determines whether the bitmap signature of the query name and the bitmap signature of the target name have a number of character n-grams overlapping that meet or exceed a configurable threshold to generate a second preliminary value. In making the determination in blocks 210 and 212, the name matching system 110 determines a number of how many character n-grams are overlapping for the comparison. If the number is below the configurable threshold, the name matching system 110 generates a preliminary value of false, and, if the number meets or exceeds the configurable threshold, the name matching system 110 generates a preliminary value of true.

In block 214, the name matching system 110 combines the preliminary values from each comparison (done in blocks 210 and 212) using a logical operation to generate an intermediate value. In certain embodiments, the intermediate value is a Boolean value. For two bitmap distributions, the name matching system 110 combines the first preliminary value and the second preliminary value using a logical operation. For example, a logical OR operation between at least two distinct bitmap distribution comparisons is used to maximize search recall, a logical AND operation between at least two distinct bitmap distribution comparisons is used to maximize search precision and performance (i.e., speed), and a combination of logical AND and OR operations between at least three distinct bitmap distribution comparisons are used to balance search precision and recall.

In particular, for the first preliminary value and the second preliminary value, the logical operation may be: (1) the first preliminary value OR the second preliminary value; or (2) the first preliminary value AND the second preliminary value.

Also, if there are more than two preliminary values (associated with more than two bitmap distributions), then, the logical operation may include logical operators of OR and AND in any combination. Some examples include, but are not limited to: (1) the first preliminary value OR the second preliminary value AND third preliminary value; (2) the first preliminary value OR the second preliminary value OR third preliminary value; etc. From block 214 (FIG. 2B), processing continues to block 216 (FIG. 2C).

In block 216, the name matching system 110 determines whether the logical combination results in an intermediate value of true. If so, processing continues to block 218, otherwise, processing continues to block 220.

In block 218, the name matching system 110 determines that the query name and the target name are to be processed for further comparisons. In certain embodiments, the further comparisons may include additional checks to determine whether the names represent a same person. In block 220, the name matching system 110 determines that the query name and the target name are not similar and, therefore, no further comparisons are to be done.

In block 222, the name matching system 110 determines whether there are additional names from the set of names to be selected for comparison with the query name. If so, processing is finished, otherwise, processing continues to block 204 (FIG. 2A) to select another target name.

Figure 3:
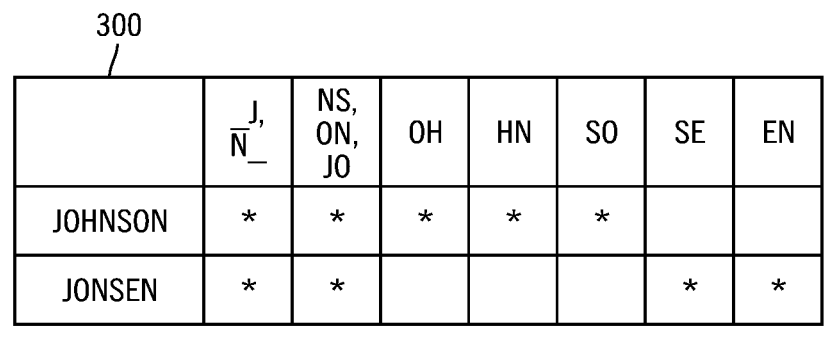

FIG. 3 illustrates a subset of a first bitmap distribution 300 for the names JOHNSON and JONSEN in accordance with certain embodiments. Only character n-grams that play a role in the comparison of these two names are shown.

In FIG. 3, each row in the first bitmap distribution 300 has a name and a bitmap signature made up of bits that are set or not set according to the bigrams of that name and the shown distribution. Suppose, for example, that the bigrams NS, ON, and JO were all assigned to the same bitmap position. Also, the bigrams _J and N_ were assigned to the same bitmap position. Then, the two names JOHNSON and JONSEN have two common bits set in their bitmap signatures. These two possibly related names JOHNSON and JONSEN would not be subject to further comparison, since there are not enough bitmap positions in common. That is, the names JOHNSON and JONSEN have 2/7 bits in common, which is too low to meet or exceed a configurable threshold in this example.

Figure 4:
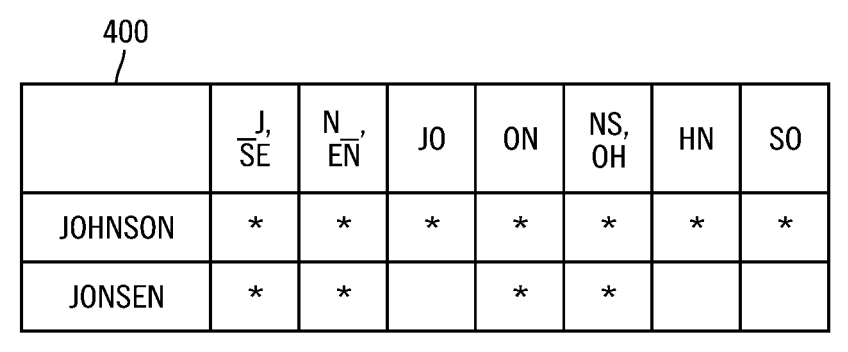

FIG. 4 illustrates a subset of a second bitmap distribution 400 for the names JOHNSON and JONSEN in accordance with certain embodiments. In the second bitmap distribution 400, the names JOHNSON and JONSEN have 4/7 bits in common, which is enough to meet or exceed the configurable threshold in this example. Then, doing a logical OR operation on the bitmap comparisons from the first bitmap distribution 300 and the second bitmap distribution 400 would mean that the names JOHNSON and JONSEN would be sent for further comparisons.

Figure 5:
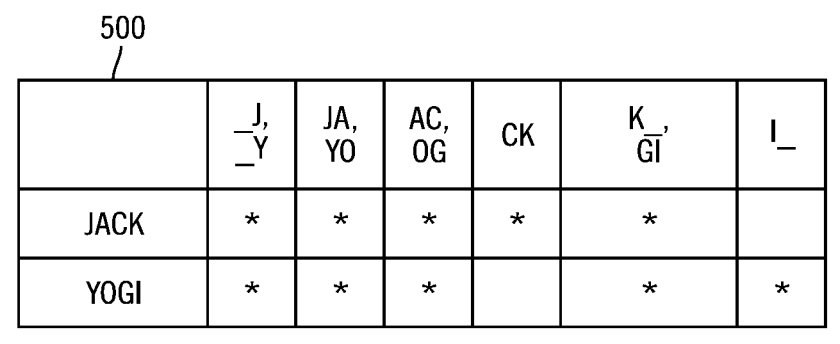

FIG. 5 illustrates a subset of a first bitmap distribution 500 for the names JACK and YOGI in accordance with certain embodiments. In the first bitmap distribution 500, the names JACK and YOGI have 4/6 bits in common, which is enough to meet or exceed the configurable threshold in this example.

Figure 6:
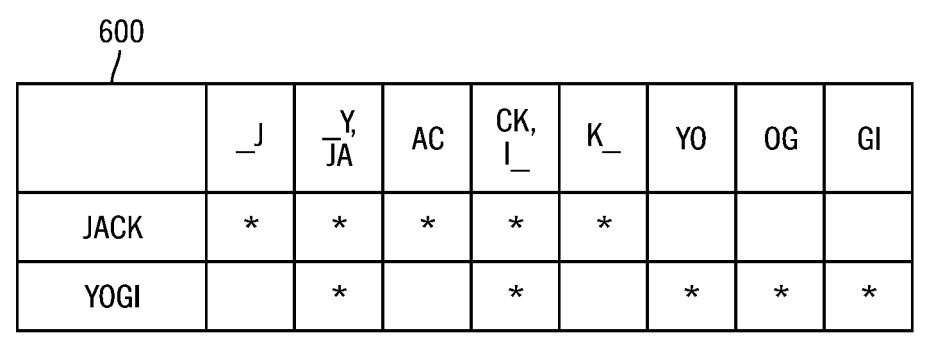

FIG. 6 illustrates a subset of a second bitmap distribution 600 for the names JACK and YOGI in accordance with certain embodiments. In the second bitmap distribution 600, the names JACK and YOGI have 2/8 bits in common, which is too low to meet or exceed a configurable threshold in this example. Then, doing a logical AND operation on the bitmap comparisons from the first bitmap distribution 500 and the second bitmap distribution 600 would mean that the names would not be sent for further comparisons.

Figure 7:
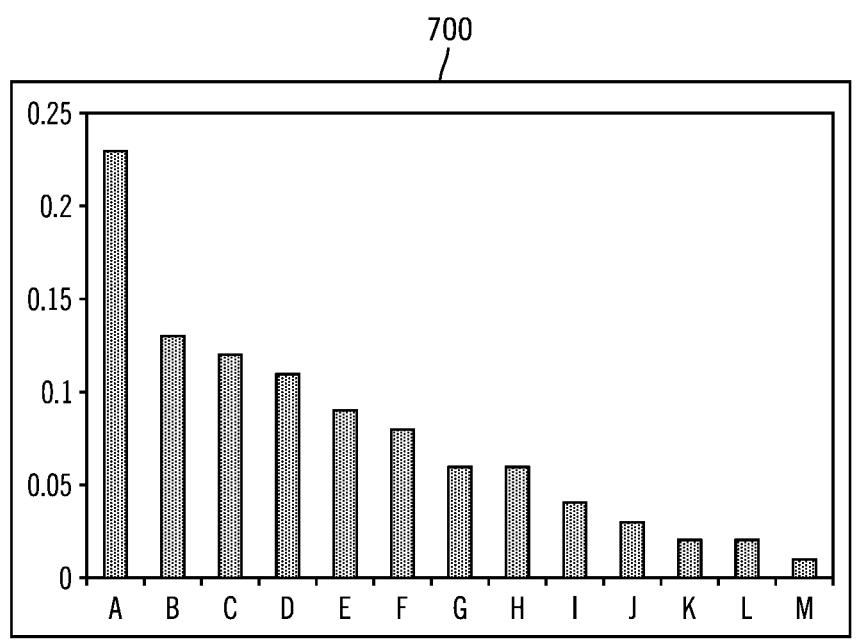
FIG. 7 illustrates a graph of each bigram and a weight/frequency of each bigram in accordance with certain embodiments.

FIG. 7 illustrates a graph 700 of each n-gram (A, B, etc.) and a weight/frequency of each bigram in accordance with certain embodiments.

Figure 8:
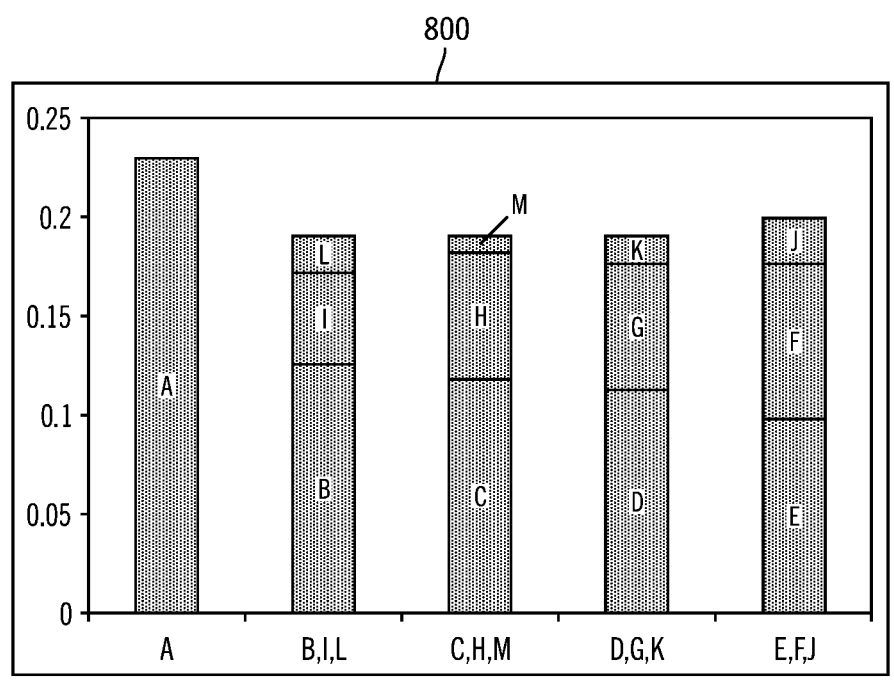
FIG. 8 illustrates a first bitmap distribution for bigrams in accordance with certain embodiments.

FIG. 8 illustrates a first bitmap distribution 800 for n-grams in accordance with certain embodiments. In the first bitmap distribution 800, each n-gram is assigned, in descending order of frequency, to the bitmap position with the lowest cumulative frequency.

Figure 9:
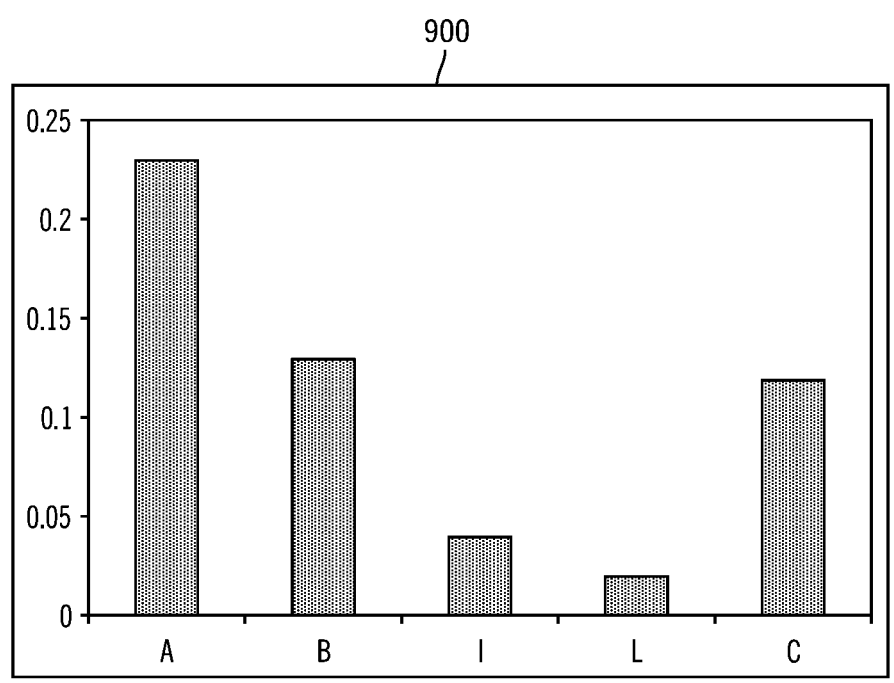
FIG. 9 illustrates a partially constructed second bitmap distribution for bigrams in accordance with certain embodiments.

FIG. 9 illustrates a partially constructed second bitmap distribution 900 for n-grams in accordance with certain embodiments. To create the second bitmap distribution 900, the name matching system 110 changes the order and goes in the order of the n-grams from the first bitmap distribution 900. In particular, the name matching system 110 reads off the x-Axis from the first bitmap distribution 800 to get A, B, I, L, C, H, M, D, G, K, E, F, and J. The name matching system 110 puts A, B, I, L, and C in separate bitmap positions.

Figure 10:
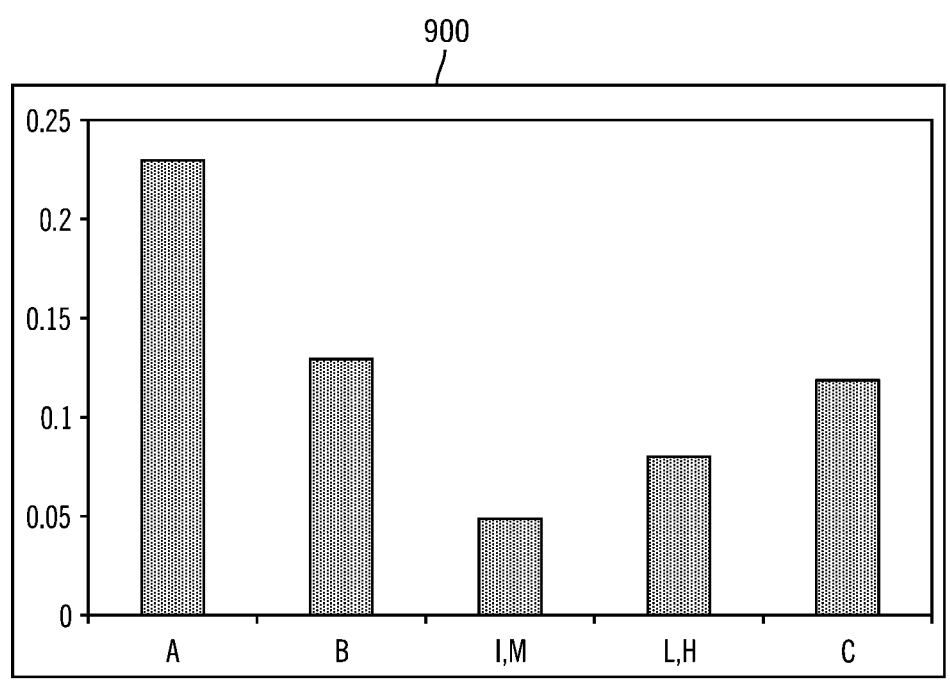
FIG. 10 illustrates adding to a partially constructed second bitmap distribution for bigrams in accordance with certain embodiments.

FIG. 10 illustrates adding to the partially constructed second bitmap distribution 900 for n-grams in accordance with certain embodiments. The name matching system 110 adds H to the bitmap position with the lowest cumulative frequency that has not already been used by the current bitmap position (C, H, M) from the first bitmap distribution 800. In particular, the name matching system 100 adds H in bitmap position 4 with L. Similarly, the name matching system 110 puts M in bitmap position 3 with I.

Figure 11:
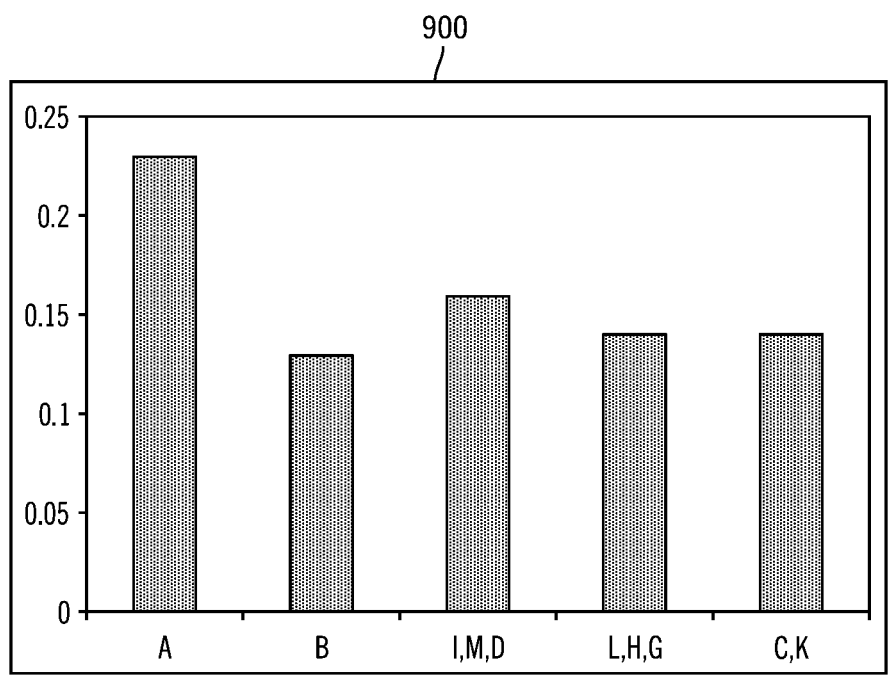
FIG. 11 illustrates further adding to a partially constructed second bitmap distribution for bigrams in accordance with certain embodiments.

FIG. 11 illustrates further adding to the partially constructed second bitmap distribution 900 for n-grams in accordance with certain embodiments. The name matching system 110 adds D to the bitmap position 3, G to bitmap position 4, and K to bitmap position 5.

Figure 12:
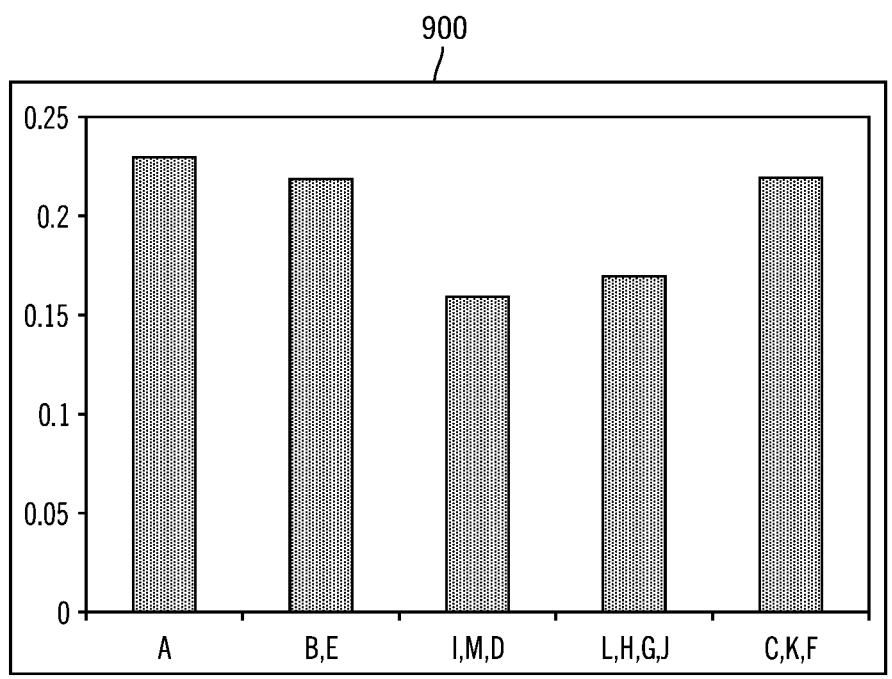
FIG. 12 illustrates a completely constructed second bitmap distribution for bigrams in accordance with certain embodiments.

FIG. 12 illustrates additional adding to the partially constructed second bitmap distribution 900 for n-grams in accordance with certain embodiments. The name matching system 110 adds E to the bitmap position 2, F to bitmap position 5, and J to bitmap position 4. These additions complete the construction of the second bitmap distribution 900.

FIG. 13 illustrates a table 1300 showing two distinct bitmap distributions of character n-grams in accordance with certain embodiments. No two n-grams that share a bitmap position from the first bitmap distribution share a bitmap position in the second bitmap distribution. For example, B, I, and L are all in different bitmap positions in the second distribution. A third bitmap distribution may be created that has different overlapping n-grams from either the first bitmap distribution or the second bitmap distribution.

The name matching system 110 provides the ability to force two names to pass through both bitmap distributions or either bitmap distribution.

Thus, the name matching system 110 uses a minimum of two bitmap distributions of character n-grams. The first distribution is based on the frequencies of character n-gram occurrences in a sample of names (e.g., drawn either from a representative sample of multicultural names or from the names that occur in the name list to be searched). The character n-grams in the first distribution are optimally distributed such that character n-grams with a higher probability of occurrence overlap to the minimum degree possible with other character n-grams. At least a second distribution is created such that any overlapping character n-grams in the first distribution do not overlap in the subsequent distribution. The comparisons of bitmap signatures of the query name and data list name being compared for each distribution are subjected to a logical AND or logical OR operation (or possibly both in the presence of three or more bitmap distributions), based on whether the user wishes to maximize precision and performance, maximize recall, or balance precision and recall. Names whose overlapping character n-grams pass a configurable threshold in one or more distributions are sent through for a more thorough name comparison.

The name matching system 110 uses at least a second bitmap distribution that is distinct from the first bitmap distribution. Using at least a second bitmap distribution (1) reduces the possibility of missing names due to bitmap clashes, and (2) allows the user to configure the use of the bitmap distributions using logical operations to maximize the results for either recall or precision.

In certain embodiments, the name matching system 110 distributes character n-grams into bitmap positions so that the probability that unrelated character n-grams assigned to the same bit is minimized. The name matching system 110 creates a minimum of two bitmap distributions of character n-grams, with a first distribution based on the frequencies of character n-gram occurrences in a sample of names, a feature that allows the character n-grams in the first distribution to be distributed such that character n-grams with a higher probability of occurrence overlap to the minimum degree possible with other character n-grams. The name matching system 110 creates at least a second bitmap distribution created such that as many overlapping character n-grams as possible in the first distribution do not overlap in the subsequent distribution. The name matching system 110 compares the character n-grams in the query name and data list name being compared using a logical AND or logical OR operation. The name matching system 110 selects names that have a number of overlapping character n-grams that pass a configurable threshold to be sent through for a more thorough name comparison.

In certain embodiments, the name matching system 110 distributes character n-grams into bitmap positions in a first bitmap based on the frequency of occurrence of the character n-grams in a name data list to form a first distribution, distributes the character n-grams into bitmap positions in a second bitmap in which to the largest degree possible any two distinct character n-grams do not share the same bitmap position with other generated distributions to form a second distribution; determines a number of qualifying bitmap pairs for a first and second name as the number of bitmap pairs for the first and second name that use the same character n-gram distribution and have a number of common bits that exceeds a given, configurable threshold, and, in response to the number of qualifying bitmap pairs exceeding a minimum number of qualifying bitmap pairs, performing a further comparison of the first and second name for similarity.

In certain embodiments, the minimum number of qualifying bitmap comparisons is one (1), in order to leverage the multiple distinct character n-gram distributions to increase the probability of finding matching names.

In certain embodiments, the minimum number of qualifying bitmap comparisons is equal to the total number of distinct character n-gram distributions in order to reduce the likelihood of a further comparison of the query and target name unless there is a strong match.

In certain embodiments, the minimum number of qualifying bitmap comparisons is equal to at least half the number of total number of distinct character n-gram distributions in order to balance improvements to both the probability of finding matching names and to reduce the likelihood of further comparisons of weak matches.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 2 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 14:
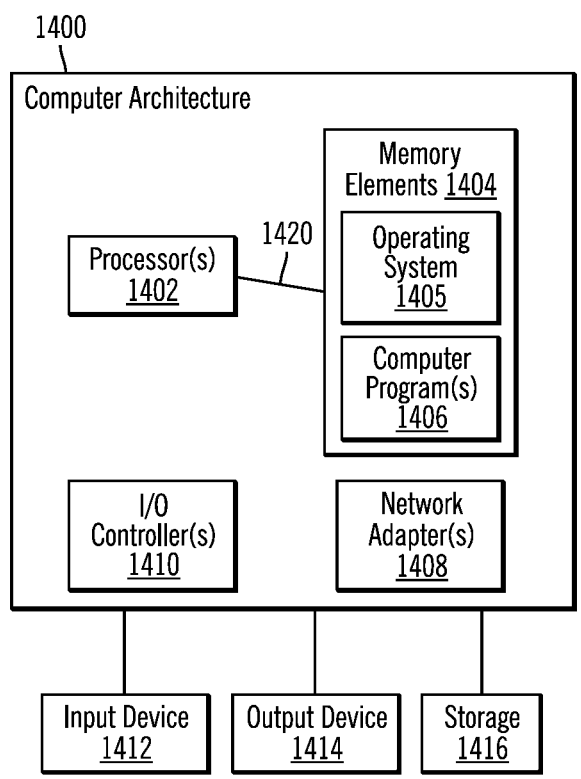
FIG. 14 illustrates, in a block diagram, a computer architecture that may be used in accordance with certain embodiments.

FIG. 14 illustrates a computer architecture 1400 that may be used in accordance with certain embodiments. Server computer 100 may implement computer architecture 1400. The computer architecture 1400 is suitable for storing and/or executing program code and includes at least one processor 1402 coupled directly or indirectly to memory elements 1404 through a system bus 1420. The memory elements 1404 may include local memory employed during actual execution of the program code, bulk storage, and cache memories which provide temporary storage of at least some program code in order to reduce the number of times code must be retrieved from bulk storage during execution. The memory elements 1404 include an operating system 1405 and one or more computer programs 1406.

Input/Output (I/O) devices 1412, 1414 (including but not limited to keyboards, displays, pointing devices, etc.) may be coupled to the system either directly or through intervening I/O controllers 1410.

Network adapters 1408 may also be coupled to the system to enable the data processing system to become coupled to other data processing systems or remote printers or storage devices through intervening private or public networks. Modems, cable modem and Ethernet cards are just a few of the currently available types of network adapters 1408.

The computer architecture 1400 may be coupled to storage 1416 (e.g., any type of storage device; a non-volatile storage area, such as magnetic disk drives, optical disk drives, a tape drive, etc.). The storage 1416 may comprise an internal storage device or an attached or network accessible storage. Computer programs 1406 in storage 1416 may be loaded into the memory elements 1404 and executed by a processor 1402 in a manner known in the art.

The computer architecture 1400 may include fewer components than illustrated, additional components not illustrated herein, or some combination of the components illustrated and additional components. The computer architecture 1400 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer program product for matching names, the computer program product comprising:
   a non-transitory computer readable storage medium having computer readable program code embodied therein, wherein the computer readable program code, when executed by a processor of a computer, is configured to perform operations of:
   creating a first bitmap distribution of character n-grams distributed into bitmap positions in descending order of frequency of occurrence of the character n-grams in a set of names based on bitmap positions with a lowest cumulative frequency, wherein at least two distinct character n-grams are assigned to a same bitmap position of the bitmap positions;
   creating a second bitmap distribution of the character n-grams distributed into the bitmap positions so that the at least two distinct character n-grams are assigned to different bitmap positions and so that any overlapping character n-grams in the first bitmap distribution do not overlap in the second bitmap distribution;
   using the first bitmap distribution, determining whether a first bitmap signature of a query name and a second bitmap signature of a target name in a set of names have a number of character n-grams overlapping that meet or exceed a first configurable threshold to generate a first preliminary value;
   using the second bitmap distribution, determining whether a third bitmap signature of the query name and a fourth bitmap signature of the target name have a number of character n-grams overlapping that meet or exceed a second configurable threshold to generate a second preliminary value; and
   in response to determining that a logical operation applied to the first preliminary value and the second preliminary value results in a value of true, determining that the query name and the target name are to be processed for further comparisons.

2. The computer product of claim 1, wherein the computer readable program code, when executed by the processor of the computer, is configured to perform operations of:
   in response to determining that the logical operation applied to the first preliminary value and the second preliminary value results in a value of false, determining that the query name and the target name are not similar and no further comparisons are to be done.

3. The computer program product of claim 1, wherein the logical operation comprises a logical OR operation between the first preliminary value and the second preliminary value.

4. The computer program product of claim 1, wherein the logical operation comprises a logical AND operation between the first preliminary value and the second preliminary value.

5. The computer program product of claim 1, wherein the computer readable program code, when executed by the processor of the computer, is configured to perform operations of:
   creating one or more additional bitmap distributions of the character n-grams for the set of names by distributing the character n-grams into bitmap positions in each of the one or more additional distributions so that at least two distinct character n-grams that were assigned to a same bitmap position in a previous distribution are not assigned to the same bitmap position in a subsequent distribution;
   generating an additional preliminary value for each of the one or more additional bitmap distributions; and
   combining the first preliminary value, the second preliminary value, and each additional preliminary value using logical operations.

6. The computer program product of claim 5, wherein the logical operations comprise a combination of logical AND OR operations.

7. The computer program product of claim 1, wherein a minimum number of matching preliminary values is set at one.

8. The computer program product of claim 1, wherein a minimum number of matching preliminary values is equal to a total number of distinct character n-gram distributions.

9. The computer program product of claim 1,wherein a minimum number of matching prelimary value is equal to at least a half of a number of total distant character n-gram distributions.

10. A computer system for matching names, comprising:
    a processor; and
    a storage device coupled to the processor, wherein the storage device has stored thereon a program, and wherein the processor is configured to execute instructions of the program to perform operations, wherein the operations comprise:
    creating a first bitmap distribution of character n-grams distributed into bitmap positions in descending order of frequency of occurrence of the character n-grams in a set of names based on bitmap positions with a lowest cumulative frequency, wherein at least two distinct character n-grams are assigned to a same bitmap position of the bitmap positions;

creating a second bitmap distribution of the character n-grams distributed into the bitmap positions so that the at least two distinct character n-grams are assigned to different bitmap positions and so that any overlapping character n-grams in the first bitmap distribution do not overlap in the second bitmap distribution;

using the first bitmap distribution, determining whether a first bitmap signature of a query name and a second bitmap signature of a target name in a set of names have a number of character n-grams overlapping that meet or exceed a first configurable threshold to generate a first preliminary value;

using the second bitmap distribution, determining whether a third bitmap signature of the query name and a fourth bitmap signature of the target name have a number of character n-grams overlapping that meet or exceed a second configurable threshold to generate a second preliminary value; and in response to determining that a logical operation applied to the first preliminary value and the second preliminary value results in a value of true, determining that the query name and the target name are to be processed for further comparisons.

11. The computer system of claim 10, wherein the operations further comprise:

in response to determining that the logical operation applied to the first preliminary value and the second preliminary value results in a value of false, determining that query name and the target name are not similar and no further comparisons are to be done.

12. The computer system of claim 10, wherein the logical operation comprises a logical OR operation between the first preliminary value and the second preliminary value.

13. The computer system of claim 10, wherein the logical operation comprises a logical AND operation between the first preliminary value and the second preliminary value.

14. The computer system of claim 10, wherein the operations further comprise:

creating one or more additional bitmap distributions of the character n-grams for the set of name by distributing the character n-grams into bitmap positions in each of the one or more additional distributions so that at least two distinct character n-grams that were assigned to a same bitmap position in a previous distribution are not assigned to the same bitmap position in a subsequent distribution;

generating an additional preliminary value for each of the one or more additional bitmap distributions; and combining the first preliminary value, the second preliminary value, and each additional preliminary value using logical operations.

15. The computer system of claim 14, wherein the logical operations comprise a combination of logical AND OR operations.

16. The computer system of claim 10, wherein the minimum number of matching preliminary values is set at one.

17. The computer system of claim 10, wherein the minimum number of matching preliminary values is equal to a total number of distinct character n-gram distributions.

18. The computer system of claim 10, wherein the minimum number of matching preliminary values is equal to at least a half of a number of total distinct character n-gram distributions.

* * * * *